(12) United States Patent
Kang

(10) Patent No.: US 11,760,363 B2
(45) Date of Patent: Sep. 19, 2023

(54) DEVICE AND METHOD FOR CONTROLLING TRAVEL OF VEHICLE

(71) Applicants: HYUNDAI MOTOR COMPANY, Seoul (KR); KIA CORPORATION, Seoul (KR)

(72) Inventor: Dong Hoon Kang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 135 days.

(21) Appl. No.: 17/325,723

(22) Filed: May 20, 2021

(65) Prior Publication Data
US 2022/0144285 A1     May 12, 2022

(30) Foreign Application Priority Data
Nov. 9, 2020   (KR) .................... 10-2020-0148713

(51) Int. Cl.
*B60W 40/105*     (2012.01)
*B60W 40/107*     (2012.01)
*G06V 20/56*      (2022.01)

(52) U.S. Cl.
CPC ........ *B60W 40/105* (2013.01); *B60W 40/107* (2013.01); *G06V 20/56* (2022.01); *B60W 2520/105* (2013.01); *B60W 2720/103* (2013.01)

(58) Field of Classification Search
CPC ............. B60W 40/105; B60W 40/107; B60W 2520/105; B60W 2720/103; G06V 20/56
See application file for complete search history.

(56) References Cited

U.S. PATENT DOCUMENTS

| | | | |
|---|---|---|---|
| 2007/0150157 A1* | 6/2007 | Lee ..................... | B60K 31/0083 701/93 |
| 2010/0292888 A1* | 11/2010 | Taguchi ................ | B60W 10/06 701/31.4 |
| 2010/0324795 A1* | 12/2010 | Tsumori ................ | B60W 10/08 701/70 |
| 2013/0289874 A1* | 10/2013 | Taguchi ................. | G01C 21/34 701/400 |
| 2015/0105993 A1* | 4/2015 | Um ..................... | B60W 30/146 701/93 |
| 2016/0171889 A1* | 6/2016 | Park ................. | G08G 1/096775 701/93 |
| 2018/0267076 A1* | 9/2018 | Shou ........................ | B60Q 9/00 |

(Continued)

*Primary Examiner* — Jeff A Burke
*Assistant Examiner* — Mohamad O El Sayah
(74) *Attorney, Agent, or Firm* — LEMPIA SUMMERFIELD KATZ LLC

(57) ABSTRACT

A device for controlling travel of a vehicle includes: a sensor that acquires information on a surrounding region of the vehicle, and a controller that generates a speed profile based on the information on the surrounding region of the vehicle, calculates an average acceleration in the speed profile based on a current vehicle speed and a vehicle speed at a predetermined time point, and calculates a required acceleration at a time point at which a difference between the speed profile and the average acceleration is greatest, and performs travel control based on at least one of the average acceleration or the required acceleration. The device allows a longitudinal control to be performed based on the speed profile generated by the vehicle, thereby improving an accuracy of autonomous driving.

14 Claims, 7 Drawing Sheets

(56) References Cited

U.S. PATENT DOCUMENTS

2019/0168755 A1* 6/2019 Knoller ................. B60W 30/16
2019/0315354 A1* 10/2019 Kleemann ........... B60W 30/184
2020/0086868 A1* 3/2020 Seo ....................... B60W 30/16
2020/0346659 A1* 11/2020 Düser ............. B60W 30/18072
2021/0089041 A1* 3/2021 Das Gupta ...... B60W 30/18163

* cited by examiner

DEVICE AND METHOD FOR CONTROLLING TRAVEL OF VEHICLE

CROSS-REFERENCE TO RELATED APPLICATION

This application claims priority to and the benefit of Korean Patent Application No. 10-2020-0148713, filed on Nov. 9, 2020, the entire contents of which are incorporated herein by reference.

FIELD

The present disclosure relates to a device and a method for controlling travel of a vehicle.

BACKGROUND

The statements in this section merely provide background information related to the present disclosure and may not constitute prior art.

Recently, development of a driver travel assistance technology using various sensors and electronic devices is in progress for driver convenience. Such travel assistance function may include a function of controlling travel by generating a speed profile by a vehicle itself based on information on a surrounding region of the vehicle.

In general, the vehicle calculates an average acceleration using a current vehicle speed and a speed at a predetermined specific time point based on the speed profile, and performs longitudinal travel control based on the average acceleration. However, we have discovered that even when the speed profile that decelerates until reaching the specific time point and accelerates at the specific time point is generated, because the vehicle controls the longitudinal travel based on the average acceleration calculated using the current vehicle speed and the speed at the specific time point, there is a limitation in that the travel control is not performed based on the speed profile. In addition, there is a problem that a collision risk may occur because a sufficient deceleration is not performed even when a fast deceleration is required before reaching the specific time point.

SUMMARY

The present disclosure has been made to solve the above-mentioned problems occurring in the prior art while advantages achieved by the prior art are maintained intact.

An aspect of the present disclosure provides a device and a method for controlling travel of a vehicle capable of performing a longitudinal control of the vehicle based on a speed profile.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling travel of a vehicle includes a sensor that acquires information on a surrounding region of the vehicle, and a controller that generates a speed profile based on the information on the surrounding region of the vehicle, calculates an average acceleration in the speed profile based on a current vehicle speed and a vehicle speed at a predetermined time point, and calculates a required acceleration at a time point at which a difference value between the speed profile and the average acceleration is a maximum value among difference values between the speed profile and the calculated average acceleration, and performs a travel control based on at least one of the average acceleration and/or the required acceleration.

In one implementation, the controller may calculate a first difference value between the average acceleration and a maximum speed of an acceleration section, and a second difference value between the average acceleration and a minimum speed of a deceleration section when the speed profile includes the acceleration section and the deceleration section.

In one implementation, the controller may perform the travel control based on the required acceleration when a difference between the first difference value and the second difference value exceeds a threshold value.

In one implementation, the controller may perform the travel control based on the average acceleration when the difference between the first difference value and the second difference value is equal to or less than the threshold value.

In one implementation, the controller may determine whether the travel control corresponds to the speed profile after performing the travel control based on the average acceleration or the required acceleration.

In one implementation, the controller may maintain the travel control when it is determined that the travel control corresponds to the speed profile.

In one implementation, the controller may perform the travel control based on the required acceleration when it is determined that the travel control does not correspond to the speed profile and when the difference between the first difference value and the second difference value is equal to or less than the threshold value.

According to another aspect of the present disclosure, a method for controlling travel of a vehicle includes: acquiring, by a sensor, information on a surrounding region of the vehicle; generating, by a controller, a speed profile based on the information on the surrounding region of the vehicle; calculating, by the controller, an average acceleration in the speed profile based on a current vehicle speed and a vehicle speed at a predetermined time point; and calculating, by the controller, required acceleration at a time point at which a difference value between the speed profile and the average acceleration is a maximum value among difference values between the speed profile and the calculated average acceleration; and performing, by the controller, a travel control based on at least one of the average acceleration or the required acceleration.

In one implementation, the method may further include calculating a first difference value between the average acceleration and a maximum speed of an acceleration section, and a second difference value between the average acceleration and a minimum speed of a deceleration section when the speed profile includes the acceleration section and the deceleration section.

In one implementation, the method may further include performing the travel control based on the required acceleration when a difference between the first difference value and the second difference value exceeds a threshold value.

In one implementation, the method may further include performing the travel control based on the average acceleration when the difference between the first difference value and the second difference value is equal to or less than the threshold value.

In one implementation, the method may further include determining whether the travel control corresponds to the speed profile after performing the travel control based on the average acceleration or the required acceleration.

In one implementation, the method may further include maintaining the travel control when it is determined that the travel control corresponds to the speed profile.

In one implementation, the method may further include performing the travel control based on the required acceleration when it is determined that the travel control does not correspond to the speed profile and when the difference between the first difference value and the second difference value is equal to or less than the threshold value.

DRAWINGS

In order that the disclosure may be well understood, there will now be described various forms thereof, given by way of example, reference being made to the accompanying drawings, in which.

Figure 1:
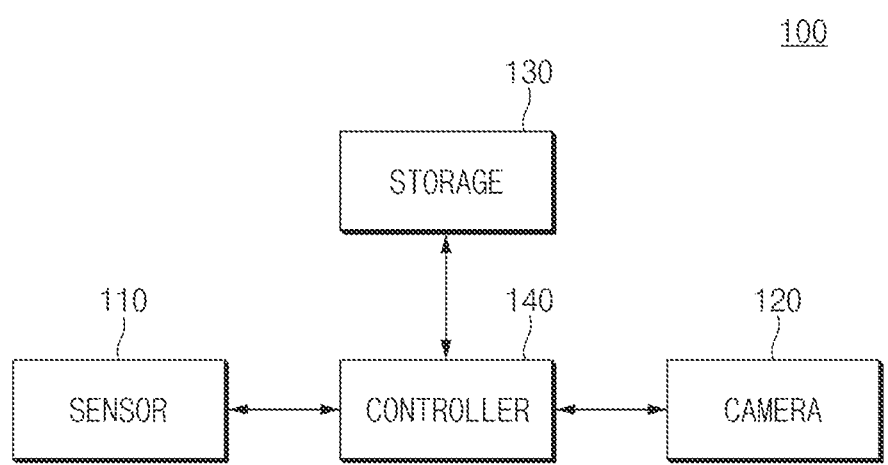
FIG. 1 is a block diagram illustrating a configuration of a travel control device of a vehicle according to an form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of the related known configuration or function will be omitted when it is determined that it interferes with the understanding of the forms of the present disclosure.

In describing the components of the forms according to the present disclosure, terms such as first, second, A, B, (a), (b), and the like may be used. These terms are merely intended to distinguish the components from other components, and the terms do not limit the nature, order or sequence of the components. Unless otherwise defined, ail terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a configuration of a travel control device of a vehicle according to an exemplary form of the present disclosure.

As shown in FIG. 1, a travel control device 100 of a vehicle according to an exemplary form of the present disclosure may include a sensor 110, a camera 120, storage 130, and a controller 140.

The sensor 110 may acquire information on a surrounding region of a vehicle. According to an exemplary form of the present disclosure, the sensor 110 may sense a vehicle or an obstacle ahead. In more detail, the sensor 110 may acquire information on a preceding vehicle, a road, a structure around the road, a road surface, and a line. In one form, the sensor 110 may include a radar, a lidar, and/or the like.

The camera 120 may acquire the information (an image) on the surrounding region of the vehicle. The camera 120 may acquire the information on the preceding vehicle, the road, the structure around the road, the road surface, and the line. To this end, the camera 120 may include a front camera for acquiring an image of a region ahead of the vehicle, left and right-side cameras for acquiring images of regions on left and right sides of the vehicle, a rear camera for acquiring an image of a region at the rear of the vehicle, and the like. The camera 120 may include a CCD sensor or a CMOS sensor.

The storage 130 may store at least one algorithm that performs operation or execution of various commands for an operation of the travel control device of the vehicle according to one form of the present disclosure. According to some forms of the present disclosure, the storage 130 may include at least one storage medium of a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, or an optical disk.

The controller 140 may be implemented various processing devices such as a microprocessor or the like with an embedded semiconductor chip or the like capable of performing the operation or the execution of the various commands, and may control the operation of the travel control device of the vehicle according to exemplary forms of the present disclosure. Specifically, a speed profile of the vehicle may be generated based on the information on the surrounding region of the vehicle acquired by the sensor 110 or the camera 120, an average acceleration may be calculated in the speed profile based on a current vehicle speed and a vehicle speed at a predetermined time point, a required acceleration may be calculated at a point at which a difference between the speed profile and the average acceleration is the greatest, and travel control may be performed based on at least one of the average acceleration and/or the required acceleration. A more specific description of the operation of the controller 140 will be described with reference to FIGS. 2 to 5.

Figure 2:
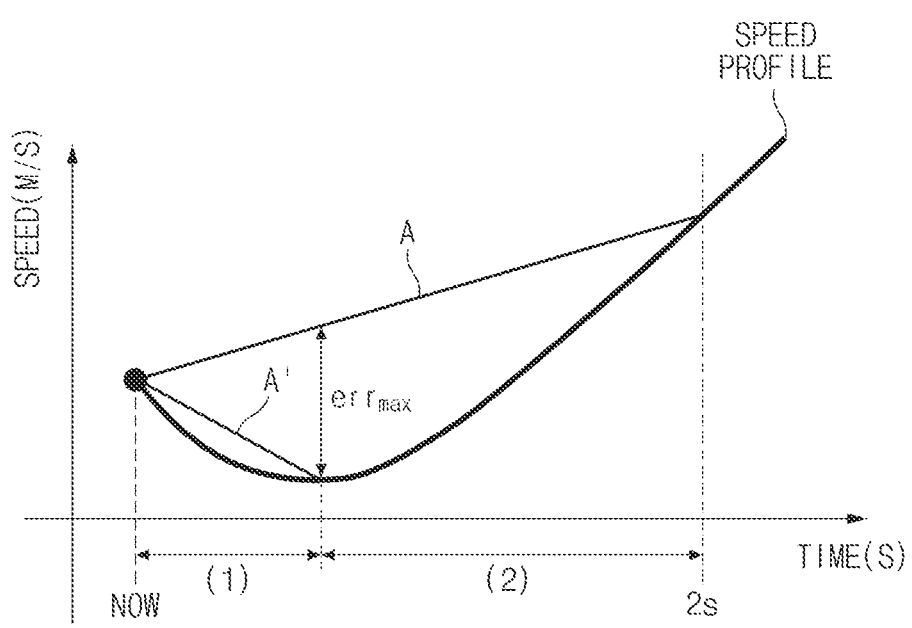
FIG. 2 is a view illustrating a required acceleration based on a speed profile according to one form of the present disclosure.
Figure 3A:
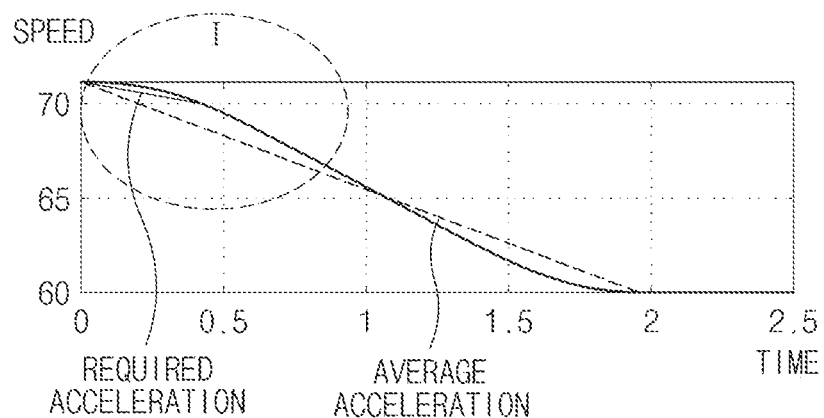
FIG. 3A is a view illustrating a speed profile according to an exemplary form of the present disclosure.
Figure 3B:
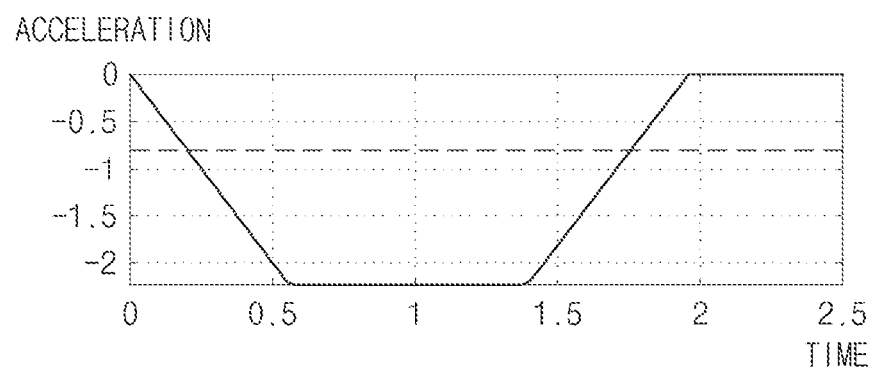
FIG. 3B is a view illustrating an acceleration profile according to an exemplary form of the present disclosure.
Figure 4:
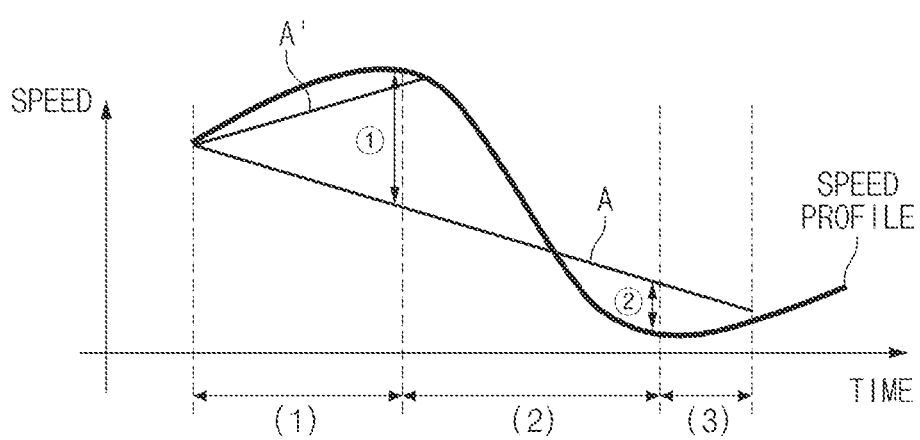
FIGS. 4 and 5 are views schematically illustrating a scheme for determining a speed profile according to some forms of the present disclosure.
Figure 5:
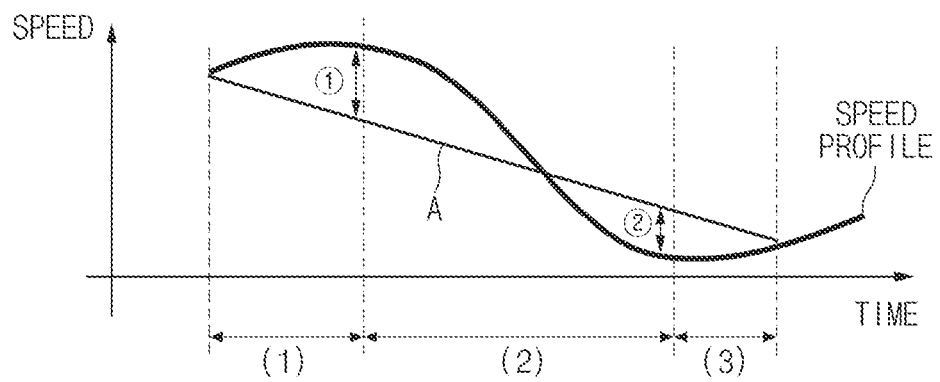

FIG. 2 is a view illustrating a required acceleration based on a speed profile according to another form of the present disclosure. FIG. 3A is a view illustrating a speed profile according to an exemplary form of the present disclosure, and FIG. 3B is a view illustrating an acceleration profile according to an exemplary form of the present disclosure. FIGS. 4 and 5 are views schematically illustrating a scheme for determining a speed profile according to some forms of the present disclosure.

As shown in FIG. 2, in one form of the present disclosure, the controller 140 may generate the speed profile based on the information on the surrounding region of the vehicle acquired by the sensor 110 or the camera 120.

The controller 140 may calculate an average acceleration "A" in the speed profile based on the speed of the vehicle at the current time point and the speed of the vehicle at the predetermined time point (e.g., a time point after 2 seconds have elapsed). However, as shown in FIG. 2, because the speed profile includes a deceleration section "1" and an acceleration section "2", when the controller 140 controls the travel using the calculated average acceleration "A", it is difficult to perform the travel control based on a speed profile of the deceleration section "1".

Therefore, according to an form of the present disclosure, the controller 140 may calculate a required acceleration A' based on a speed of the vehicle at a time point at which a difference $err_{max}$ between the average acceleration and the speed profile is the greatest among differences between the speed profile and the calculated average acceleration. Accordingly, when the controller 140 performs the travel control based on the required deceleration A', the travel control may be performed based on the speed profile of the deceleration section "1".

When the speed profile includes the deceleration section and the acceleration section, the controller 140 may determine (predict) whether the speed profile includes the deceleration section or the acceleration section by an influence of inertia resulted from the current vehicle speed. This is to more accurately control the travel by determining (predicting) whether the speed prof le has been generated by the inertia or by the information on the surrounding region of the vehicle sensed by the sensor 110 or the camera 120 because the controller 140 may generate a speed profile in an upwardly convex shape like a section "I" by the inertia when the vehicle decelerates in an accelerating situation as shown in FIG. 3A.

To this end, the controller 140 may compare the speed. profile with the average acceleration. According to an exemplary form, when the speed profile includes an acceleration section "1", a deceleration section "2", and an acceleration section "3" as shown in FIGS. 4 and 5, the controller 140 may calculate a first difference value ① between the average acceleration "A" and a maximum speed of the acceleration sections "1" and "3", and a second difference value ② between the average acceleration "A" and a minimum speed of the deceleration section "2". In addition, the controller 140 may determine whether a difference between the first difference value and the second difference value is equal to or less than a threshold value.

According to one form, when the difference between the first difference value and the second difference value exceeds the threshold value as shown in FIG. 4, the controller 140 may determine (predict) that the speed profile has been generated by the information on the surrounding region of the vehicle acquired by the sensor 110 or the camera 120. In addition, when it is determined (predicted) that the speed profile has been generated by the information on the surrounding region of the vehicle, the controller 140 may calculate the required acceleration A' based on a speed at a time point at which the first difference value occurs and the current vehicle speed. In addition, the controller 140 may perform the travel control based on the required acceleration A'.

On the other hand, when the difference between the first difference value and the second difference value is equal to or less than the threshold value as shown in FIG. 5, the controller 140 may determine (predict) that the speed profile has been generated due to the influence of inertia caused by the current vehicle speed. In this case, the controller 140 may calculate the average acceleration. "A" based on the current vehicle speed and the vehicle speed at the predetermined time point. In addition, the controller 140 may perform the travel control based on the average acceleration "A".

After performing the travel control as described above, the controller 140 may determine whether the travel control corresponds to the speed profile. When it is determined that the travel control corresponds to the speed profile, the controller 140 may maintain the travel control.

On the other hand, when it is determined that the travel control does not correspond to the speed profile, and when the difference between the first difference value and the second difference value is equal to or less than the threshold value, the controller 140 may perform the travel control based on the required acceleration. That is, when the difference between the first difference value and the second difference value is equal to or less than the threshold value, the controller 140 determined (predicted) that the speed profile has been generated by the influence of the inertia resulted from the current vehicle speed, and performed the travel control based on the average acceleration "A". When it is determined that such travel control does not correspond to the speed profile, the controller 140 may determine such case as a determination (prediction) error, and perform the travel control based on the required acceleration.

In another form, when it is determined that the travel control does not correspond to the speed profile, and when the difference between the first difference value and the second difference value exceeds the threshold value, the controller 140 may perform the travel control based on the average acceleration. That is, when the difference between the first difference value and the second difference value exceeds the threshold value, the controller 140 determined (predicted) that the speed profile has been generated by the information on the surrounding region of the vehicle and performed the travel control based on the required acceleration. When it is determined that such travel control does not correspond to the speed profile, the controller 140 may determine such case as the determination (prediction) error, and perform the travel control based on the average acceleration.

Figure 6:
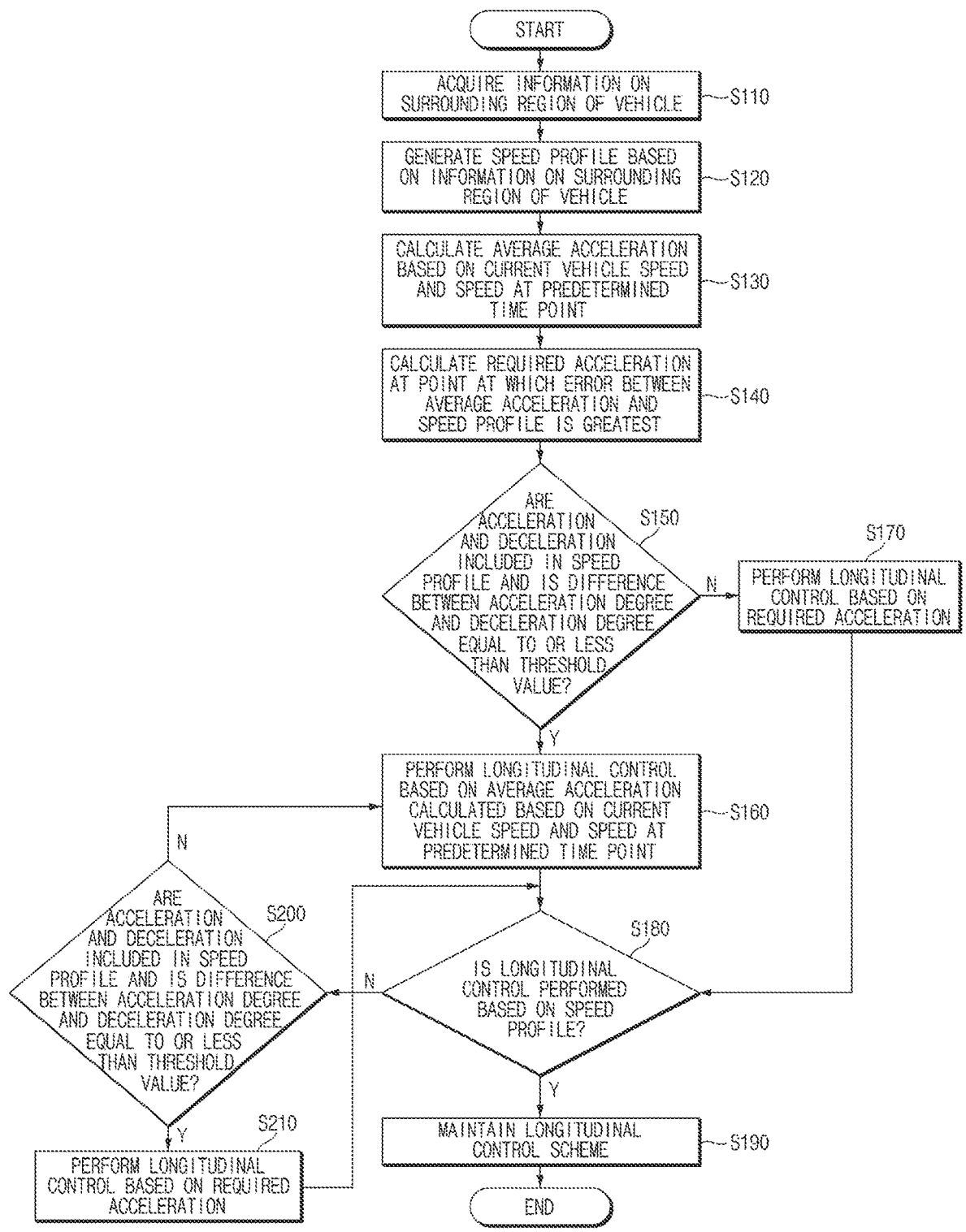
FIG. 6 is a flowchart illustrating a travel control method of a vehicle according to another form of the present disclosure.

FIG. 6 is a flowchart illustrating a travel control method of a vehicle according to another form of the present disclosure.

As shown ln FIG. 6, the controller 140 may acquire the information on the surrounding region of the vehicle acquired by the sensor 110 or the camera 120 (at step S110). The controller 140 may generate the speed profile based on the information on the surrounding region of the vehicle (at step S120).

The controller 140 may calculate the average acceleration based on the speed of the current time point and the speed at the predetermined time point based on the speed profile (at step S130). The controller 140 may calculate the required acceleration at the time point at which the error between the average acceleration and the speed profile is the greatest (at step S140).

When the speed profile includes the acceleration section and the deceleration section, the controller 140 may determine whether a difference between an acceleration degree and a deceleration degree is equal to or less than the threshold value based on the average acceleration (at step S150). When the speed profile includes the deceleration section and the acceleration section through the step S150, the controller 140 may determine (predict) whether the speed profile includes the deceleration section or the acceleration section by the influence of the inertia resulted from the current vehicle speed.

According to another form, in step S150, as shown in FIGS. 4 and 5, when the speed profile includes the acceleration section "1", the deceleration section "2", and the acceleration section "3", the controller 140 may calculate the first difference value ① between the average acceleration "A" and the maximum speed of the acceleration sections "1" and "3", and the second difference value ② between the average acceleration "A" and the minimum speed of the deceleration section "2". In addition, the controller 140 may determine whether the difference between the first difference value and the second difference value is equal to or less than the threshold value.

When it is determined in step S150 that the difference between the first difference value and the second difference value is equal to or less than the threshold value (Y), the controller 140 may determine (predict) that the speed profile has been generated by the influence of the inertia resulted from the current vehicle speed. In this case, the average acceleration "A" may be calculated based on the current vehicle speed and the vehicle speed at the predetermined time point. In addition, the controller 140 may perform the travel control based on the average acceleration "A" (at step S160).

On the other hand, when the difference between the first difference value and the second difference value exceeds the threshold value, the controller 140 may determine (predict) that the speed profile has been generated by the information on the surrounding region of the vehicle acquired by the sensor 110 or the camera 120. In addition, when it is determined (predicted) that the speed profile has been generated by the information on the surrounding region of the vehicle, the controller 140 may calculate the required acceleration A' based on the speed at the time point at which the first difference value occurs and the current vehicle speed. In addition, the controller 140 may perform the travel control based on the required acceleration A' (at step S170).

After performing the travel control as in S160 and S170, the controller 140 may determine whether the travel control corresponds to the speed profile (at step S180).

In step S180, when it is determined that the travel control corresponds to the speed profile, the controller 140 may maintain the travel control (at step S190).

On the other hand, when it is determined in step S180 that the travel control does not correspond to the speed profile (N), and when the difference between the first difference value and the second difference value is equal to or less than the threshold value (Y) (at step S200), the controller 140 may perform. the travel control based on the required acceleration (at step S210).

That is, when the difference between the first difference value and the second difference value is equal to or less than the threshold value in step S150, the controller 140 determined (predicted) that the speed profile has been generated by the influence of the inertia resulted from the current vehicle speed, and performed the travel control based on the average acceleration "A" (at step S170). When it is determined that the travel control of the step S180 does not correspond to the speed profile, the controller 140 may determine such case as the determination (predictiono) error, and perform the travel control based on the required acceleration (S210).

In addition, after it is determined in step S180 that the travel control does not correspond to the speed profile (N), when the difference between the first difference value and the second difference value exceeds the threshold value (N) (S200), the controller 140 may perform the step S160.

That is, when the difference between the first difference value and the second difference value exceeds the threshold value in step S150, the controller 140 determined (predicted) that the speed profile has been generated by the information on the surrounding region of the vehicle and performed the travel control based on the required acceleration (at step S130). When it is determined that the travel control of the step S180 does not correspond to the speed profile, the controller 140 may determine such case as the determination (prediction) error, and perform the travel control based on the average acceleration (at step S160).

Figure 7:
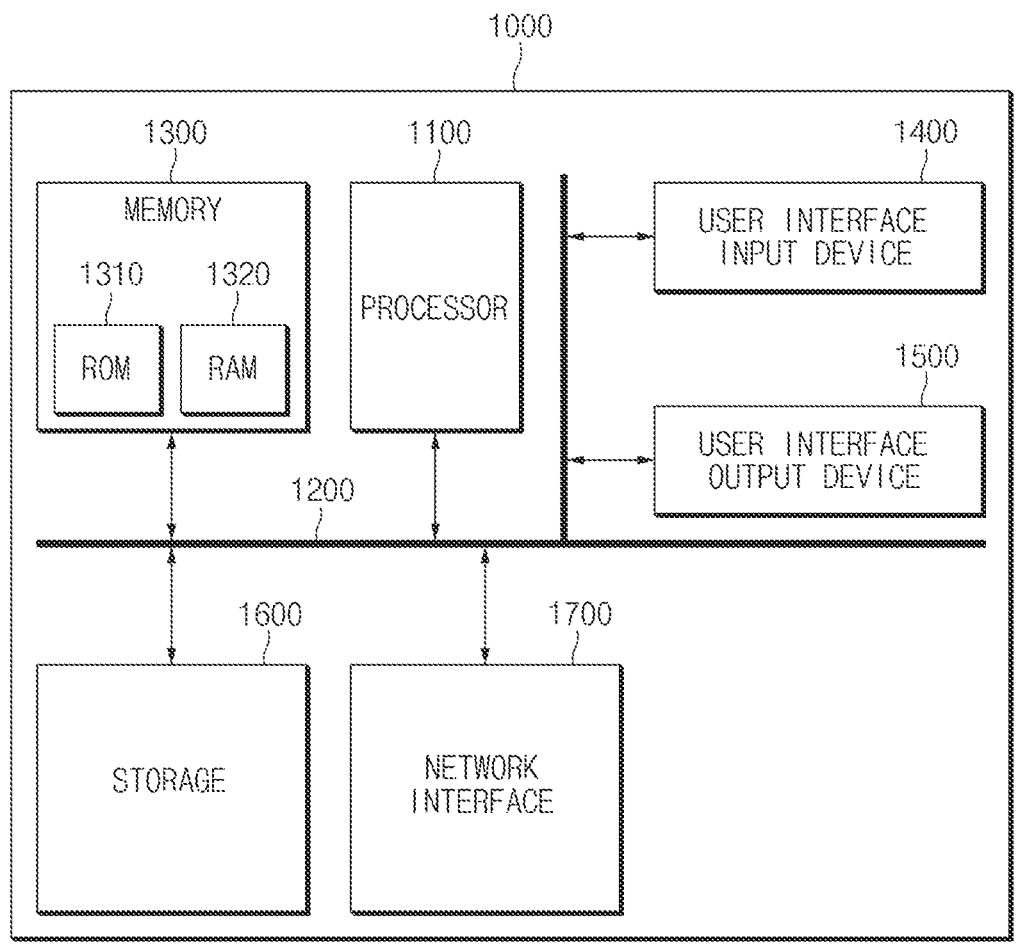
FIG. 7 illustrates a computing system in which a method according to an exemplary form of the present disclosure is implemented.

FIG. 7 illustrates a computing system in which a method according to another form of the present disclosure is implemented.

With reference to FIG. 7, a computing system 1000 may include at least one processor 1100, a memory 1300, a user interface .input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components the user terminal.

The description above is merely illustrative of the technical idea of the present disclosure, and various modifications and changes may be made by those skilled in the art without departing from the essential characteristics or the present disclosure.

Therefore, the exemplary forms disclosed in the present disclosure are not intended to limit the technical idea of the present disclosure but to illustrate the present disclosure, and the scope of the technical idea of the present disclosure is not limited by the forma. The scope of the present disclosure should be construed as being covered by the scope of the appended claims, and all technical ideas falling within the scope of the claims should be construed as being included in the scope of the present disclosure.

The device and the method for controlling the travel of the vehicle according to the exemplary forms of the present disclosure may improve an accuracy of autonomous driving by allowing the longitudinal control to be performed based on the speed profile generated by the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device for controlling travel of a vehicle, the device comprising:
    a sensor configured to acquire information on a surrounding region of the vehicle; and
    a controller configured to:
        generate a speed profile based on the acquired information;
        calculate an average acceleration in the speed profile based on a current vehicle speed and a vehicle speed at a predetermined time point; and
        calculate a required acceleration at a time point at which a difference value between a minimum speed of a deceleration section included in the speed profile and the calculated average acceleration is a maximum value among difference values between the speed profile and the calculated average acceleration, and perform a travel control based on at least one of the calculated average acceleration or the required acceleration.

2. The device of claim 1, wherein the controller is further configured to calculate a first difference value between the calculated average acceleration and a maximum speed of an acceleration section, and a second difference value between the calculated average acceleration and the minimum speed of the deceleration section when the speed profile includes the acceleration section and the deceleration section.

3. The device of claim 2, wherein the controller is further configured to perform the travel control based on the required acceleration when a difference between the first difference value and the second difference value exceeds a threshold value.

4. The device of claim 3, wherein the controller is further configured to perform the travel control based on the calculated average acceleration when the difference between the first difference value and the second difference value is equal to or less than the threshold value.

5. The device of claim 4, wherein the controller is further configured to determine whether the travel control corresponds to the speed profile after performing the travel control based on the calculated average acceleration or the required acceleration.

6. The device of claim 5, wherein the controller is further configured to maintain the travel control when the travel control corresponds to the speed profile.

7. The device of claim 5, wherein the controller is further configured to perform the travel control based on the required acceleration when the travel control does not correspond to the speed profile and when the difference between the first difference value and the second difference value is equal to or less than the threshold value.

8. A method for controlling travel of a vehicle, the method comprising:
    acquiring, by a sensor, information on a surrounding region of the vehicle;
    generating, by a controller, a speed profile based on the acquired information;
    calculating, by the controller, an average acceleration in the speed profile based on a current vehicle speed and a vehicle speed at a predetermined time point;
    calculating, by the controller, a required acceleration at a time point at which a difference value between a minimum speed of a deceleration section included in the speed profile and the calculated average acceleration is a maximum value among difference values between the speed profile and the calculated average acceleration; and
    performing, by the controller, the travel control based on at least one of the calculated average acceleration or the required acceleration.

9. The method of claim 8, further comprising:
    calculating, by the controller, a first difference value between the calculated average acceleration and a maximum speed of an acceleration section, and a second difference value between the calculated average acceleration and the minimum speed of the deceleration section when the speed profile includes the acceleration section and the deceleration section.

10. The method of claim 9, further comprising:
    performing, by the controller, the travel control based on the required acceleration when a difference between the first difference value and the second difference value exceeds a threshold value.

11. The method of claim 10, further comprising:
    in response to determining that the difference between the first difference value and the second difference value is equal to or less than the threshold value, performing, by the controller, the travel control based on the calculated average acceleration.

12. The method of claim 11, further comprising:
    determining, by the controller, whether the travel control corresponds to the speed profile after performing the travel control based on the calculated average acceleration or the required acceleration.

13. The method of claim 12, further comprising:
    in response to determining that the travel control corresponds to the speed profile, maintaining, by the controller, the travel control.

14. The method of claim 12, further comprising:
    in response to determining that the travel control does not correspond to the speed profile and that the difference between the first difference value and the second difference value is equal to or less than the threshold value, performing, by the controller, the travel control based on the required acceleration.

* * * * *